US006118966A

United States Patent [19]

Deishi et al.

[11] Patent Number: 6,118,966

[45] Date of Patent: Sep. 12, 2000

[54] IMAGE FORMING APPARATUS AND IMAGE FORMING METHOD

[75] Inventors: Satoshi Deishi, Ibaraki; Hiroyuki Yamasaki, Amagasaki; Tomoo Izumi, Osaka; Katsuhiko Takeda, Toyonaka, all of Japan

[73] Assignee: Minolta Co., Ltd., Osaka, Japan

[21] Appl. No.: 09/193,843

[22] Filed: Nov. 18, 1998

[30] Foreign Application Priority Data

Nov. 19, 1997 [JP] Japan .................................... 9-318541

[51] Int. Cl.$^7$ ..................................................... G01G 15/10

[52] U.S. Cl. ............................................ 399/237; 430/119

[58] Field of Search .................................... 399/237, 239, 399/246, 247, 248, 127; 347/140; 430/117, 118, 119

[56] References Cited

U.S. PATENT DOCUMENTS 4,272,599 6/1981 Moradzadeh .
5,963,760 10/1999 Takeda et al. ...................... 399/237 X
5,983,058 11/1999 Yamasaki et al. ...................... 399/237
5,987,281 11/1999 Kurotori et al. ........................ 399/237
5,987,282 11/1999 Tsukamoto et al. .................... 399/237
5,995,787 11/1999 Takeda et al. .......................... 399/237

FOREIGN PATENT DOCUMENTS 07271107 10/1995 Japan .
07271198 10/1995 Japan .

*Primary Examiner*—Sophia S. Chen
*Attorney, Agent, or Firm*—McDermott, Will & Emery

[57] ABSTRACT

An image forming apparatus has an image carrying member having a movable surface and an electrostatic latent image carried thereon, a release agent application device for applying a release agent to the surface of the image carrying member, and an ink developing device for bringing an ink into contact with the image carrying member having the electrostatic latent image formed thereon and the release agent applied thereto, to form an ink image corresponding to the electrostatic latent image. The ratio (Ti/To) of the tack value Ti of the ink to the tack value To of the release agent is not less than 2.

20 Claims, 5 Drawing Sheets

IMAGE FORMING APPARATUS AND IMAGE FORMING METHOD

BACKGROUND OF THE INVENTION

This application is based on application No. 318541/1997 filed in Japan, the contents of which is hereby incorporated by reference.

1. Field of the Invention

The present invention relates to an image forming apparatus and an image forming method so adapted that an electrostatic latent image is formed on the surface of an image carrying member, a non-conductive release agent is applied to the surface of the image carrying member, and ink is brought into contact with the surface of the image carrying member thus having the electrostatic latent image formed thereon and the release agent applied thereto, to form an ink image corresponding to the electrostatic latent image on the surface of the image carrying member, and more particularly, to an image forming apparatus and an image forming method characterized in that the ink adheres on a portion of the electrostatic latent image formed on the surface of the image carrying member, while the ink is prevented from adhering on the portion having no electrostatic latent image formed thereon, so that a good image which has a sufficient image density and was not fogged is obtained.

2. Description of the Related Art

Conventionally, an image forming apparatus so adapted as to form an electrostatic latent image on the surface of an image carrying member, develop the electrostatic latent image, and then transfer the electrostatic latent image on a recording medium such as paper, to form an image on the recording medium has been conventionally used, as represented by an electrophotographic copying machine.

Known as one of such an image forming apparatus utilizing an electrophotographic system is one using a liquid developer obtained by dispersing colored resin particles (toner particles) in a carrier liquid in order to develop an electrostatic latent image, as disclosed in JPA-7-271107.

The liquid developer used in the electrophotographic apparatus is generally obtained by dispersing charged toner particles in an insulating carrier liquid. The toner particles are selectively consumed from the liquid developer as an image is formed. When the liquid developer is used, therefore, the density of the toner particles in the carrier liquid must be managed. The management is troublesome. Further, a large part of the carrier liquid is repeatedly used, so that the liquid developer is liable to be degraded.

Furthermore, in the electrophotographic apparatus thus using the liquid developer, when the image is formed on a recording medium such as copying paper, a fixing device or the like for fixing a ton er image transferred onto the recording medium is required. Therefore, the apparatus is complicated and is increased in size, for example.

Conventionally, an image forming apparatus so adapted that an electrostatic latent image is formed on the surface of an image carrying member, a non-conductive release agent is applied to the surface of the image carrying member, ink is brought into contact with the surface of the image carrying member thus having the electrostatic latent image formed thereon and the non-conductive release agent applied thereto, the ink is made to adhere to a portion, where the electrostatic latent image is formed, on the surface of the image carrying member, to from an ink image corresponding to the electrostatic latent image on the surface of the image carrying member, and the ink image is transferred onto a recording me dium from the surface of the image carrying member, to form an image has been proposed, as disclosed in U.S. Pat. No. 4,272,599.

In the image forming apparatus, however, there are some problems. For example, the ink does not sufficiently adhere on the portion of the electrostatic latent image formed on the surface of the image carrying member, so that the density of the formed image is decreased, and voids are created in the formed image. Contrary to this, the ink also adheres to a portion having no electrostatic latent image formed thereon in the image carrying member, so that the formed image is fogged.

SUMMARY OF THE INVENTION

An object of the present invention is to solve the above-mentioned problems in an image forming apparatus so adapted that ink is supplied to an electrostatic latent image formed on the surface of an image carrying member to form an ink image, and the ink image is transferred onto a recording medium from the image carrying member to form an image on the recording medium.

That is, an object of the present invention is to make it possible, in the above-mentioned image forming apparatus, to make ink appropriately adhere to a portion of the electrostatic latent image formed on the surface of the image carrying member, and prevent the ink from adhering on the portion having no electrostatic latent image formed thereon, so that a good image having a sufficient image density and having no voids and fogs is stably obtained.

An image forming apparatus according to the present invention comprises an image carrying member having a movable surface and an electrostatic latent image carried thereon; a release agent application device for applying a release agent on the surface of said image carrying member; an ink developing device for bringing an ink into contact with the image carrying member having the electrostatic latent image formed thereon and the release agent applied thereto, to form an ink image corresponding to the electrostatic latent image; and the ratio (Ti/To) of the tack value Ti of said ink to the tack value To of said release agent is not less than 2.

An image forming method according to the present invention comprises the steps of forming an electrostatic latent image on an image carrying member having a movable surface; applying a release agent on the surface of said image carrying member; developing said electrostatic latent image by ink to form an ink image on the surface of the image carrying member; and the ratio (Ti/To) of the tack value Ti of said ink to the tack value To of said release agent is not less than 2.

In an image forming apparatus and an image forming method according to the present invention, in a case where the ink is brought into contact with the surface of the image carrying member having the electrostatic latent image formed thereon and the release agent applied thereto, to form an ink image corresponding to the electrostatic latent image on the surface of the image carrying member, the ink is electrostatically made to adhere to the surface of the image carrying member upon pushing away the release agent in the portion where the electrostatic latent image is formed, while the release agent is interposed between the surface of the image carrying member and the ink in the portion where no electrostatic latent image is formed.

In a case where the ink and the release agent such that the tack value Ti of the ink is not less than twice the tack value To of the release agent are used as described above, when the ink in contact with the surface of the image carrying member is separated from the image carrying member, a part of the release agent between the surface of the image carrying member and the ink is cut without fail because the tack value To of the release agent is lower than the tack value Ti of the ink, so that the ink is not supplied to the surface of the image carrying member in the portion where no electrostatic latent image is formed. On the other hand, the ink which adheres on the surface of the image carrying member remains on the surface of the image carrying member in the portion where the electrostatic latent image is formed, so that the ink is supplied only to a portion where the electrostatic latent image is formed. Therefore, an ink image corresponding to the electrostatic latent image is formed on the surface of the image carrying member.

As a result, in an image forming apparatus and an image forming method according to the present invention, a good image having a sufficient image density and having no voids and fogs can be obtained.

As the above-mentioned ink, not a liquid developer containing colored resin particles (toner particles) but a liquid ink containing no colored resin particle (toner particle) is used.

If the tack value of the ink is too high, the time period elapsed until the ink is adhered to the surface of the image carrying member upon pushing away the release agent in the portion where the electrostatic latent image is formed is lengthened. Therefore, if the tack value of the ink is too high, the system speed at which an image having a sufficient image density is formed becomes very slow. Therefore, it is preferable to use an ink having the tack value of not more than 50. Further, from the same viewpoint, it is preferable to use the ink and the release agent which are combined such that the ratio (Ti/To) of the tack value Ti of said ink to the tack value To of said release agent is not more than 500, preferably not more than 300, more preferably not more than 100, and still more preferably not more than 80.

Examples of the above-mentioned image carrying member include one so constructed that a dielectric layer is formed on the surface of an electrically conductive member and an electrophotographic photoreceptor so constructed that a photosensitive layer is formed on the surface of an electrically conductive member.

In the image carrying member, examples of a material composing the electrically conductive member include metals such as aluminum, iron, copper, nickel, SUS, gold, silver, chromium, platinum, tin, and titanium, and alloys of the metals, and resins having any of the conductive materials dispersed therein. In dispersing any of the conductive materials in the resin as described above, it is possible to use, as the resin, polyethylene, polypropylene, polyvinyl alcohol, polyvinyl acetate, an ethylene-vinyl acetate copolymer, polymethyl methacrylate, polycarbonate, polystyrene, an acrylonitrile-methyl acrylate copolymer, an acrylonitrile-butadiene-styrene copolymer, polyethylene terephthalate, a polyurethane elastomer, polyamide, polyimide, etc.

Examples of a material composing the dielectric layer provided on the electrically conductive member include resins such as polyester, polypropylene, polyvinyl alcohol, polyvinyl acetate, an ethylene-vinyl acetate copolymer, polymethyl methacrylate, polycarbonate, polystyrene, an acrylonitrile-methyl acrylate copolymer, an acrylonitrile-butadiene-styrene copolymer, polyethylene terephthalate, polyurethane elastomer, viscose rayon, cellulose nitrate, cellulose acetate, cellulose triacetate, cellulose propionate, cellulose acetate butyrate, ethyl cellulose, regenerated cellulose, polyamide (nylon 6, nylon 66, nylon 11, nylon 12, nylon 46, etc.), polyimide, polysulfone, polyether sulfone, polyvinyl chloride, a vinyl chloride-vinyl acetate copolymer, polyvinylidene chloride, a vinylidene chloride-vinyl chloride copolymer, a vinyl nitrile rubber alloy, polytetrafluoroethylene, polychlorofluoroethylene, polyvinyl fluoride, and polyvinylidene fluoride, and inorganic materials composed of ceramics such as $Al_2O_3$, $SiO_2$, or $TiO_2$. It is also possible to use a combination of two or more types of dielectric materials.

As the photosensitive layer provided on the electrically conductive member, it is possible to use a photosensitive layer which is generally used in the electrophotographic photoreceptor.

As a latent image forming device for forming an electrostatic latent image on the surface of the image carrying member, when an image carrying member so adapted that a dielectric layer is formed on the surface of an electrically conductive member is used, a discharger, an electrostatic head of an ion flow type, or the like for applying charge corresponding to an image to the dielectric layer on the surface of the image carrying member to form an electrostatic latent image is used. On the other hand, when an image carrying member composed of a photoreceptor so adapted that a photosensitive layer is formed on the surface of an electrically conductive member is used, a charger for charging the surface of the image carrying member and various types of exposing devices such as a laser device for exposing the surface of the image carrying member thus charged are used in combination.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

An image forming apparatus and an image forming method according to a preferred embodiment of the present invention will be specifically described on the basis of the accompanying drawings.

Figure 1:
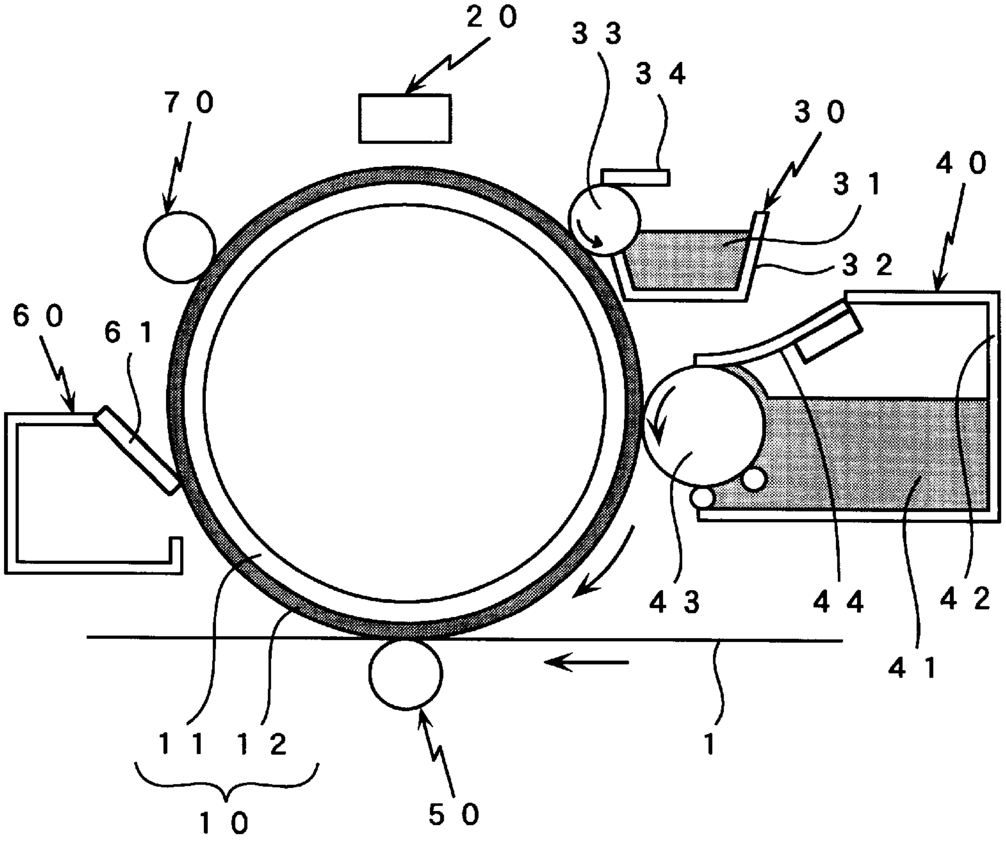
FIG. 1 is a schematic explanatory view of an image forming apparatus according to an embodiment of the present invention.

In the image forming apparatus according to the embodiment shown in FIG. 1, an image carrying member 10 so constructed that a dielectric layer 12 is formed on the surface of an electrically conductive member 11 is used. An electrostatic latent image is formed on the surface of the image carrying member 10 by a latent image forming device 20 while rotating the image carrying member 10 at the suitable system speed.

In the present embodiment, an electrostatic head 20 of an ion flow type is used as the above-mentioned latent image forming device 20. The electrostatic head 20 selectively charges the surface of the image carrying member 10 to form an electrostatic latent image.

A non-conductive release agent 31 is then applied from a releasing agent application device 30 to the surface of the image carrying member 10 having the electrostatic latent image thus formed thereon.

In applying the release agent 31 to the surface of the image carrying member 10 by the release agent application device 30, silicone oil, for example, is used as the release agent 31 in the present embodiment. A part of an application roller 33 is dipped in a containing chamber 32 containing the release agent 31, the application roller 33 is rotated, to hold the release agent 31 in the containing chamber 32 on an outer peripheral surface of the application roller 33, and the amount of the release agent 31 thus held is regulated by a blade 34, to make such adjustment that the thickness of the release agent 31 has a predetermined thickness. The release agent 31 thus having a predetermined thickness is introduced into the image carrying member 10 by the application roller 33, to apply the release agent 31 to the surface of the image carrying member 10 so as to have a suitable thickness.

Ink 41 is then supplied from an ink developing device 40 to the image carrying member 10 thus coated with the release agent 31. The ink 41 is supplied to a portion, where the electrostatic latent image is formed, on the surface of the image carrying member 10, to form an ink image corresponding to the electrostatic latent image on the surface of the image carrying member 10.

In thus forming the ink image on the surface of the image carrying member 10 by the ink developing device 40, the ink 41 contained in a main body 42 of the device is held on the surface of an ink carrying member 43 in a drum shape, and the amount of the ink 41 held on the surface of the ink carrying member 43 is regulated by a regulating member 44, to make such adjustment that the ink 41 held on the surface of an ink carrying member 43 has a predetermined thickness.

The ink 41 held on the surface of the ink carrying member 43 is then brought into contact with the surface of the image carrying member 10, to make the ink 41 adhere to a portion, where the electrostatic latent image is formed, on the surface of the image carrying member 10.

In an image forming apparatus according to the present invention, the ink 41 and the release agent 31 which are combined such that the tack value of the ink 41 is not less than twice the tack value of the release agent 31 are used.

In an image forming apparatus using the ink 41 and the release agent 31 as described above, in a case where the ink 41 held on the surface of the ink carrying member 43 is brought into contact with the surface of the image carrying member 10 coated with the release agent 31, to make the ink 41 adhere to a portion, where the electrostatic latent image is formed, on the surface of the image carrying member 10 as described above, a part of the release agent 31 between the surface of the image carrying member 10 and the ink 41 is cut without fail when the ink 41 in contact with the surface of the image carrying member 10 is separated from the image carrying member 10, whereby the ink 41 is not supplied to the surface of the image carrying member 10 in the portion where no electrostatic latent image is formed. On the other hand, the ink 41 which adheres on the surface of the image carrying member 10 remains on the surface of the image carrying member 10 in the portion where the electrostatic latent image is formed, so that the ink 41 is sufficiently supplied only to a portion where the electrostatic latent image is formed. Therefore, an ink image corresponding to the electrostatic latent image is formed on the surface of the image carrying member 10.

After the ink image is formed on the surface of the image carrying member 10, the ink image formed on the surface of the image carrying member 10 is transferred onto the recording medium 1 by a transfer roller 50, which is a transfer device 50. In this case, the ink 41 is sufficiently adhered only to a portion where the electrostatic latent image is formed, whereby an ink image corresponding to the electrostatic latent image is formed on the surface of the image carrying member 10 as described above. Since such an ink image is transferred onto the recording medium 1, a good image having a sufficient image density and having no voids and fogs is obtained.

After the ink image formed on the surface of the image carrying member 10 is transferred onto the recording medium 1, the ink 41 remaining on the surface of the image carrying member 10 after the transfer is removed from the surface of the image carrying member 10 by a cleaning device 60 using a cleaning blade 61. Thereafter, charge remaining on the surface of the image carrying member 10 is eliminated by a charge eliminating device 70, and a new electrostatic latent image is formed again on the surface of the image carrying member 10 by the latent image forming device 20. The above-mentioned operations are repeated, to from an image.

EXPERIMENTAL EXAMPLE 1

In this experimental example, the system speed of the image carrying member 10 rotated was changed in the image forming apparatus according to the above-mentioned embodiment.

In the present experimental example, Silicone Oil having a tack value To of 2.4 (Silicone Oil SH200 having a viscosity of 100 cP: manufactured by Toray Dow Coning Silicone Co., Ltd.) was used as the above-mentioned release agent 31. On the other hand, used as the ink 41 was one which is so adjusted as to have a viscosity of 20000 cP, have a tack value Ti of 10, and have an electrical resistivity of $10^{-9}$ Ω·cm by diluting commercially available ink having a viscosity of 285000 cP and having a tack value of 38 (Best Cure OL SD 797 India Ink lL: manufactured by T&K TOKA Co., Ltd.) using No. 2 ML Reducer (manufactured by T&K TOKA Co., Ltd.) and No. 2 Contex (manufactured by T&K TOKA Co., Ltd.). In this experimental example, the ratio (Ti/To) of the tack value Ti of the ink 41 to the tack value To of the release agent 31 was 4.2. Each of the above-mentioned viscosities is a value measured using an E-shaped viscosimeter (VISCONIC ED: manufactured by Tokyo Keiki Co., Ltd.) and under measuring conditions of 3°×R7.7 Corn, 0.5 rpm, and 25° C. Further, each of the above-mentioned tack values is a value measured using INKOMETER (manufactured by Toyoei Seiko Co., Ltd.) and under measuring conditions of 400 rpm and 23° C.

In the present experimental example, an electrostatic latent image having a surface potential of approximately −600 V was formed on the surface of the image carrying member 10 by the electrostatic head 20. The above-mentioned release agent 31 was applied to the surface of the image carrying member 10 having the electrostatic latent image thus formed thereon so as to have a thickness of 0.5 μm.

The ink 41 was then supplied from the ink developing device 40 to the surface of the image carrying member 10 thus coated with the release agent 31. The ink 41 was held on the surface of the ink carrying member 43 such that the thickness thereof was 10 μm, the ink 41 was brought into contact with the surface of the image carrying member 10 having the electrostatic latent image formed thereon and the release agent 31 applied thereto as described above such that the contact pressure therebetween was 0.36 kg/mm, and the nip width from the position where the ink 41 is brought into contact with the surface of the image carrying member 10 to the position where it is separated therefrom was set to 2 mm.

The system speed of the image carrying member 10 rotated as described above was changed, to form an image, and the changes in the image density in the image portion having the electrostatic latent image formed thereon and the image density in the non-image portion having no electrostatic latent image formed thereon were examined. The results thereof were shown in FIG. 2.

Figure 2:
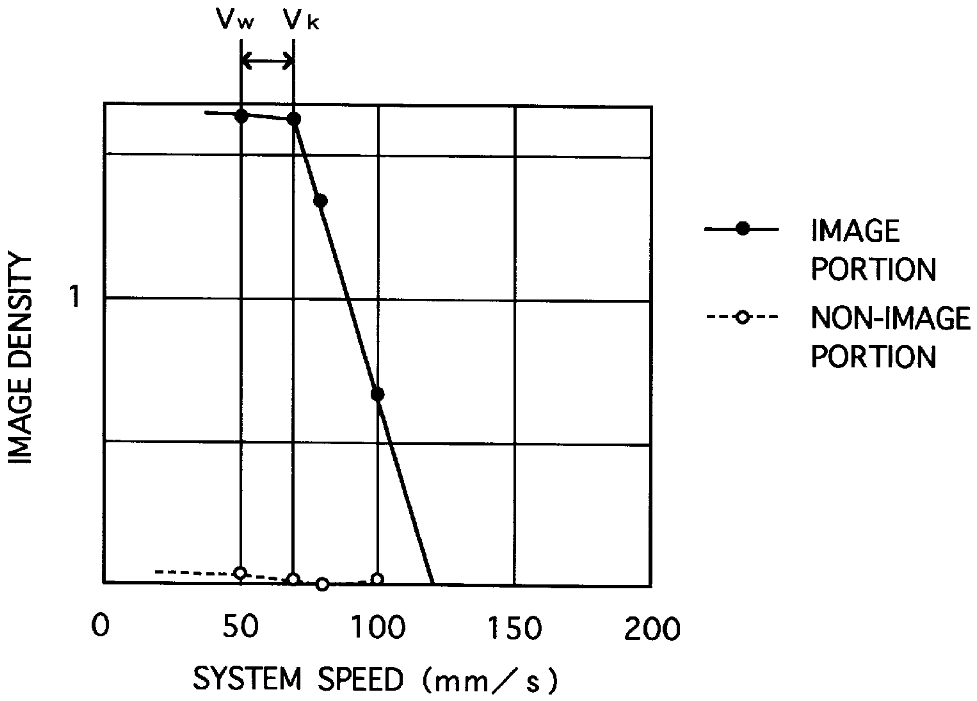
FIG. 2 is a diagram showing such a relationship that an image density in an image portion having an electrostatic latent image formed thereon and an image density in a non-image portion having no electrostatic latent image formed thereon change as the system speed changes in an experimental example 1 using the image forming apparatus shown in FIG. 1.

As a result, a good image which had a sufficient image density in the image portion and was not fogged in the non-image portion was obtained in a case where the system speed was in the range of $V_W$ to $V_K$ shown in FIG. 2. On the other hand, in the case of a system speed lower than $V_W$, the ink 41 also adhered on the non-image portion, so that the formed image was fogged. In the case of a system speed higher than $V_K$, the ink 41 was not sufficiently supplied to the image portion, so that the image density therein was rapidly decreased.

EXPERIMENTAL EXAMPLE 2

In this experimental example, Silicone Oil having a tack value To of 7 (Silicone Oil SH200 having a viscosity of 10000 cP: manufactured by Toray Dow Coning Silicone Co., Ltd.) was used as the release agent 31, while the same ink as that in the above-mentioned experimental example 1, having tack value Ti of 10 was used as the ink 41. In this case, the ratio (Ti/To) of the tack value Ti of the ink 41 to the tack value To of the release agent 31 was 1.4.

The image forming apparatus according to this experimental example was operated the same way as in the experimental example 1 except for that the release agent 31 and the ink 41 as described above were used in combination.

Figure 3:
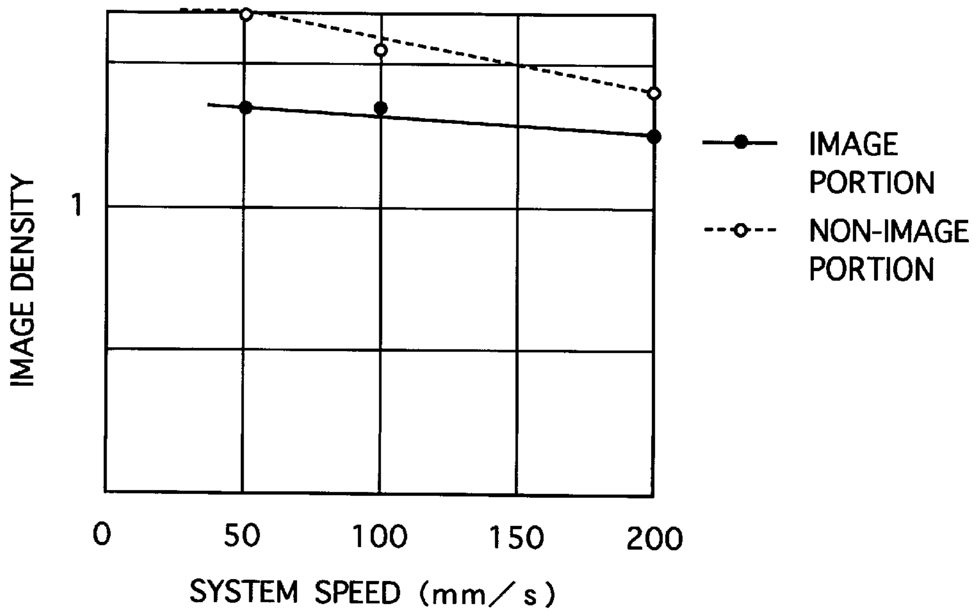
FIG. 3 is a diagram showing such a relationship that an image density in an image portion having an electrostatic latent image formed thereon and an image density in a non-image portion having no electrostatic latent image formed thereon change as the system speed changes in an experimental example 2 using the image forming apparatus shown in FIG. 1.

Also in this experimental example, the system speed of the image carrying member 10 rotated was changed, to form an image, and the changes in the image density in the image portion having the electrostatic latent image formed thereon and the image density in the non-image portion having no electrostatic latent image formed thereon were examined. The results thereof were shown in FIG. 3.

As a result, in a case where the ink 41 and the release agent 31 such that the ratio (Ti/To) of the tack value Ti of the ink 41 to the tack value To of the release agent 31 is 1.4, which is less than 2, were used, the ink 41 adhered to a portion having no electrostatic latent image formed thereon in the image carrying member at any system speed of the image carrying member 10 rotated. Therefore, a good image which had a sufficient image density in the image portion and was not fogged in the non-image portion was not obtained.

EXPERIMENTAL EXAMPLE 3

In this experimental example, the same Silicone Oil as that in the above-mentioned experimental example 1, having a tack value To of 2.4 was used as the release agent 31, while an ink having a viscosity of 90000 cP, having a tack value Ti of 0.1, and having an electrical resistivity of $10^{-9}$ Ω·cm (CD501: manufactured by Gestettoner Co., Ltd.) was used as the ink 41. In this case, the ratio (Ti/To) of the tack value Ti of the ink 41 to the tack value To of the release agent 31 was 0.04.

The image forming apparatus according to this experimental example was operated the same way as in the experimental example 1 except for that the release agent 31 and the ink 41 as described above were used in combination.

Figure 4:
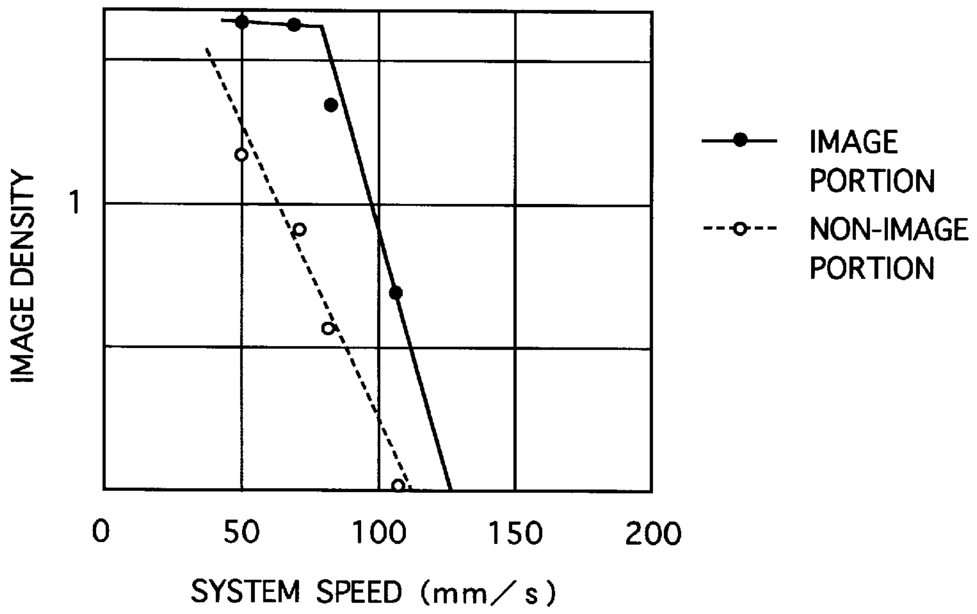
FIG. 4 is a diagram showing such a relationship that an image density in an image portion having an electrostatic latent image formed thereon and an image density in a non-image portion having no electrostatic latent image formed thereon change as the system speed changes in an experimental example 3 using the image forming apparatus shown in FIG. 1.

Also in this experimental example, the system speed of the image carrying member 10 rotated was changed, to form an image, and the changes in the image density in the image portion having the electrostatic latent image formed thereon and the image density in the non-image portion having no electrostatic latent image formed thereon were examined. The results thereof were shown in FIG. 4.

As a result, in a case where the ink 41 had the low tack value of 0.1, and the ink 41 and the release agent 31 such that the ratio (Ti/To) of the tack value Ti of the ink 41 to the tack value To of the release agent 31 is 0.04, which is less than 2, were used, the ink 41 adhered to the non-image portion having no electrostatic latent image formed thereon in the image carrying member when the image portion has a sufficient image density. Therefore, a good image which had a sufficient image density in the image portion and was not fogged in the non-image portion was not obtained.

EXPERIMENTAL EXAMPLE 4

In this experimental example, the same Silicone Oil as that in the above-mentioned experimental example 1, having a tack value To of 2.4 was used as the release agent 31, while an ink so adjusted, in the ink used in the experimental example 1, as to have a viscosity of 20000 cP, have a tack value Ti of 5, and have an electrical resistivity of $10^{-9}$ Ω·cm obtained by changing the amount of diluting commercially available ink (Best Cure OL SD 797 India Ink 1L: manufactured by T&K TOKA Co., Ltd.) were used as the ink 41. In this case, the ratio (Ti/To) of the tack value Ti of the ink 41 to the tack value To of the release agent 31 was approximately 2.

The image forming apparatus according to this experimental example was operated the same way as in the experimental example 1 except for that the release agent 31 and the ink 41 as described above were used in combination.

Also in this experimental example, the system speed of the image carrying member 10 rotated was changed, to form an image, and the changes in the image density in the image portion having the electrostatic latent image formed thereon and the image density in the non-image portion having no electrostatic latent image formed thereon were examined. The results thereof were shown in FIG. 5.

Figure 5:
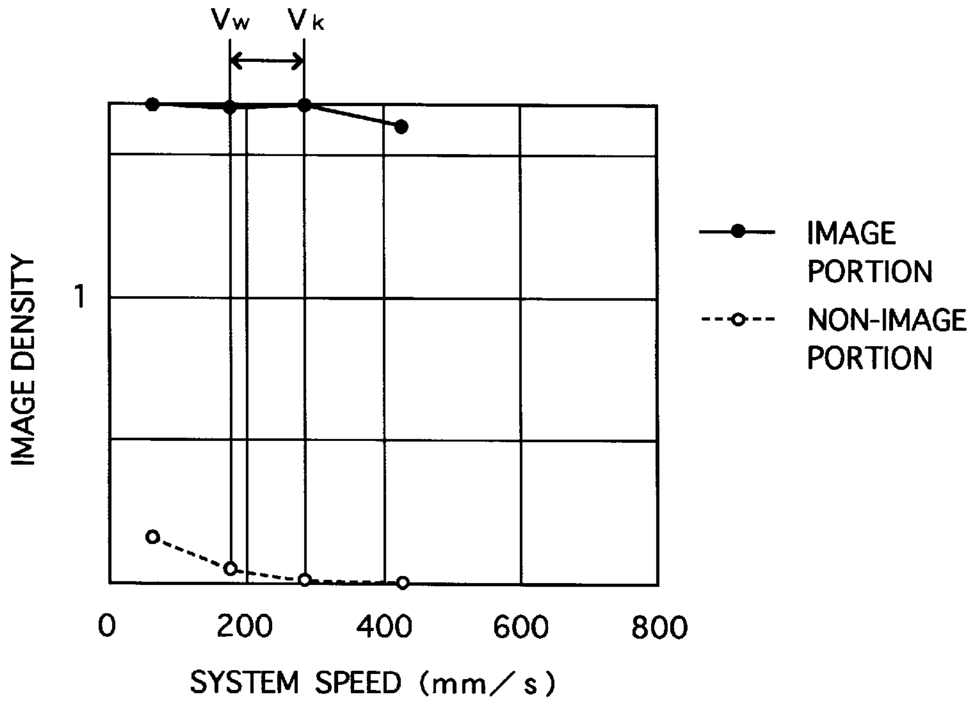
FIG. 5 is a diagram showing such a relationship that an image density in an image portion having an electrostatic latent image formed thereon and an image density in a non-image portion having no electrostatic latent image formed thereon change as the system speed changes in an experimental example 4 using the image forming apparatus shown in FIG. 1.

As a result, in a case where the ink 41 and the release agent 31 such that the ratio (Ti/To) of the tack value Ti of the ink 41 to the tack value To of the release agent 31 is approximately 2 were used, a good image which had a sufficient image density in the image portion and was not fogged in the non-image portion was obtained when the image was formed at a system speed in the range of $V_W$ to $V_K$ as shown in FIG. 5, as in the case of the above-mentioned experimental example 1.

EXPERIMENTAL EXAMPLE 5

In this experimental example, Silicone Oil having a tack value To of 0.5 (Silicone Oil SH200 having a viscosity of 2 cP: manufactured by Toray Dow Coning Silicone Co., Ltd.) was used, while the same ink as that in the abovementioned experimental example 1, having tack value Ti of 10 was used as the ink 41. In this case, the ratio (Ti/To) of the tack value Ti of the ink 41 to the tack value To of the release agent 31 was 20.

The image forming apparatus according to this experimental example was operated the same way as in the experimental example 1 except for that the release agent 31 and the ink 41 as described above were used in combination.

Also in this experimental example, the system speed of the image carrying member 10 rotated was changed, to form an image, and the changes in the image density in the image portion having the electrostatic latent image formed thereon and the image density in the non-image portion having no electrostatic latent image formed thereon were examined. The results thereof were shown in FIG. 6.

Figure 6:
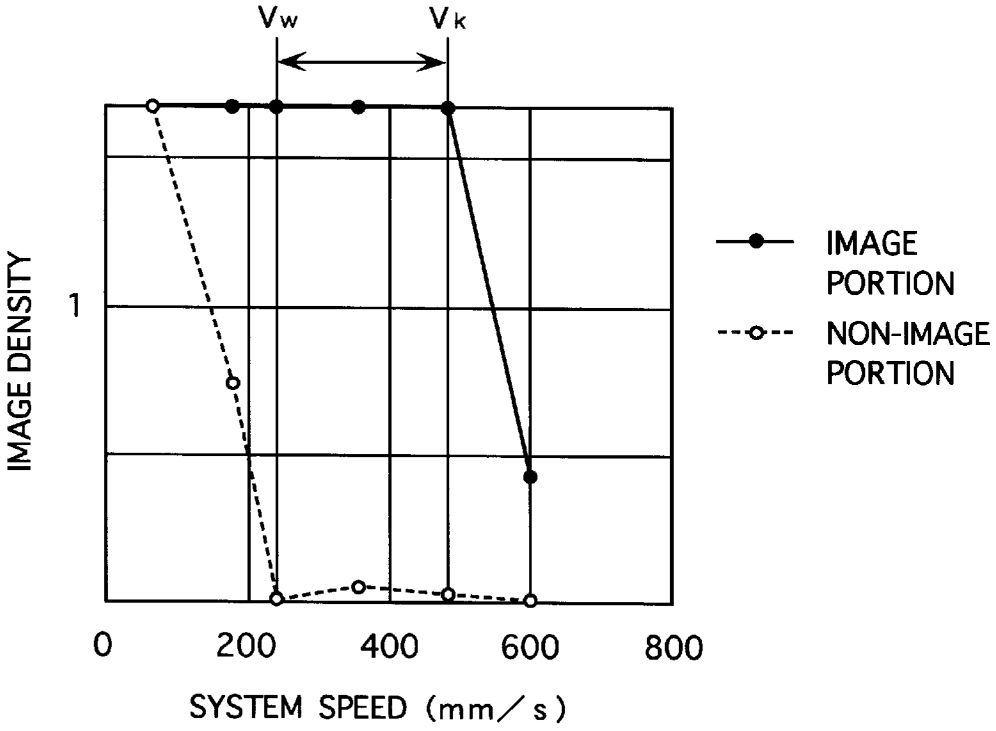
FIG. 6 is a diagram showing such a relationship that an image density in an image portion having an electrostatic latent image formed thereon and an image density in a non-image portion having no electrostatic latent image formed thereon change as the system speed changes in an experimental example 5 using the image forming apparatus shown in FIG. 1.

As a result, in a case where the ink 41 and the release agent 31 such that the ratio (Ti/To) of the tack value Ti of the ink 41 to the tack value To of the release agent 31 is approximately 20 were used, a good image which had a sufficient image density in the image portion and was not fogged in the non-image portion was obtained when the image was formed at a system speed in the range of $V_W$ to $V_K$ as shown in FIG. 6, as in the case of the above-mentioned experimental example 1.

Figure 7:
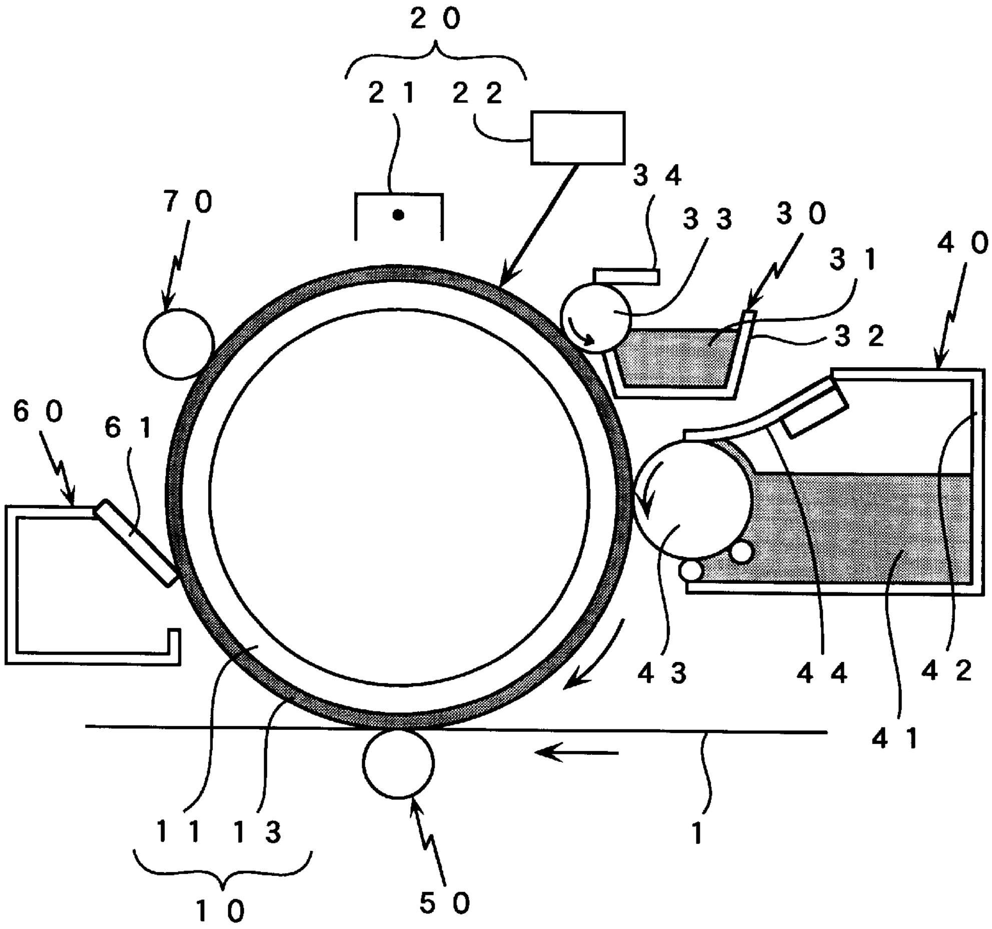
FIG. 7 is a schematic explanatory view of an image forming apparatus according to another embodiment using an image carrying member so constructed that a photosensitive layer is formed on the surface of an electrically conductive member

Although in the image forming apparatus according to the above-mentioned embodiment, the image carrying member 10 so constructed that the dielectric layer 12 is formed on the surface of the conductive member 11 was used, a photoreceptor so constructed that a photosensitive layer 13 is formed on the surface of an electrically conductive member 11 can be also used as the image carrying member 10 as shown in FIG. 7.

In forming an electrostatic latent image on the surface of the image carrying member 10 composed of the photoreceptor by the latent image forming device 20, there are provided a charger 21 for uniformly charging the surface of the image carrying member 10 and an exposing device 22 for exposing the surface of the image carrying member 10 depending on image information as the lateral image forming device 20, as shown in FIG. 7. The surface of the image carrying member 10 is uniformly charged by the charger 21, after which the surface of the image carrying member 10 is exposed depending on image information from the exposing device 22, to form an electrostatic latent image on the surface of the image carrying member 10.

In the image forming apparatus as described above, in a case where the ink 41 and the release agent 31 such that the tack value Ti of the ink 41 is not less than twice the tack value To of the release agent 31 are used, ink 41 is appropriately supplied to an electrostatic latent image formed on the surface of an image carrying member 10, whereby a good image which has a sufficient image density in the image portion and is not fogged in the non-image portion is obtained as in the case of the above-mentioned embodiment.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. An image forming apparatus comprising:

an image carrying member having a movable surface and an electrostatic latent image carried thereon;

a release agent application device for applying a release agent on the surface of said image carrying member; an ink developing device for bringing an ink into contact with the image carrying member having the electrostatic latent image formed thereon and the release agent applied thereto, to form an ink image corresponding to the electrostatic latent image; and the ratio (Ti/To) of a tack value Ti of said ink to a tack value To of said release agent is not less than 2.

2. The image forming apparatus according to claim 1, wherein said Ti/To is 2 to 500.

3. The image forming apparatus according to claim 2, wherein said Ti/To is 2 to 300.

4. The image forming apparatus according to claim 3, wherein said Ti/To is 2 to 100.

5. The image forming apparatus according to claim 2, wherein the tack value Ti of said ink is not more than 50.

6. The image forming apparatus according to claim 1, wherein said image carrying member is constructed by forming a dielectric layer on a conductive base substrate.

7. The image forming apparatus according to claim 1, wherein the ink developing devices includes an ink carrying member, and a speed at which a surface of the ink carrying member is moved is 50 mm/s to 400 mm/s.

8. The image forming apparatus according to claim 1, wherein said ink is a liquid ink having no toner particle comprising colored resin particles.

9. The image forming apparatus according to claim 1, further comprising a transfer device for transferring the ink image formed on the image carrying member onto a recording medium.

10. The image forming apparatus according to claim 1, further comprising a cleaning device for removing the ink remaining on the surface of the image carrying member.

11. An image forming method comprising the steps of:

forming an electrostatic latent image on an image carrying member having a movable surface;

applying a release agent on the surface of said image carrying member;

developing said electrostatic latent image by ink to form an ink image on the surface of the image carrying member; and the ration (Ti/To) of a tack value Ti of said ink to a tack value To of said release agent is not less than 2.

12. The image forming method according to claim 11, wherein said Ti/To is 2 to 500.

13. The image forming method according to claim 12, wherein said Ti/To is 2 to 300.

14. The image forming method according to claim 13, wherein said Ti/To is 2 to 100.

15. The image forming method according to claim 12, wherein the tack value Ti of said ink is not more than 50.

16. The image forming method according to claim 11, wherein said image carrying member is constructed by forming a dielectric layer on a conductive base substrate.

17. The image forming method according to claim 11, wherein an ink carrying member is brought into contact with the image carrying member, and a speed at which a surface of the ink carrying member is moved is 50 mm/s to 400 mm/s.

18. The image forming method according to claim 11, wherein said ink is a liquid ink having no toner particle comprising colored resin particles.

19. The image forming method according to claim 11, further comprising the step of transferring the ink image formed on the image carrying member onto a recording medium.

20. The image forming method according to claim 19, further comprising the step of removing the ink remaining on the surface of the image carrying member.

* * * * *